April 9, 1929.　　　H. E. BOYRIE　　　1,708,652
FLUID SEPARATOR
Filed Jan. 8, 1925　　　2 Sheets-Sheet 1

INVENTOR:
Harry E. Boyrie
By E. J. Andrews
Atty.

INVENTOR:
Harry E. Boyrie

Patented Apr. 9, 1929.

1,708,652

UNITED STATES PATENT OFFICE.

HARRY E. BOYRIE, OF SAN FRANCISCO, CALIFORNIA, ASSIGNOR, BY DIRECT AND MESNE ASSIGNMENTS, TO BLAW-KNOX COMPANY, OF BLAWNOX, PENNSYLVANIA, A CORPORATION OF NEW JERSEY.

FLUID SEPARATOR.

Application filed January 8, 1925. Serial No. 1,321.

This invention relates to separators which are used for separating vapors from gases particularly water from steam, and for purifying the gases such as steam by removing impurities therefrom. It has for its particular object the improvement of fluid separators such as are disclosed by the Patent No. 1,381,767 issued to H. H. Tracy, June 14, 1921.

Figure 1:
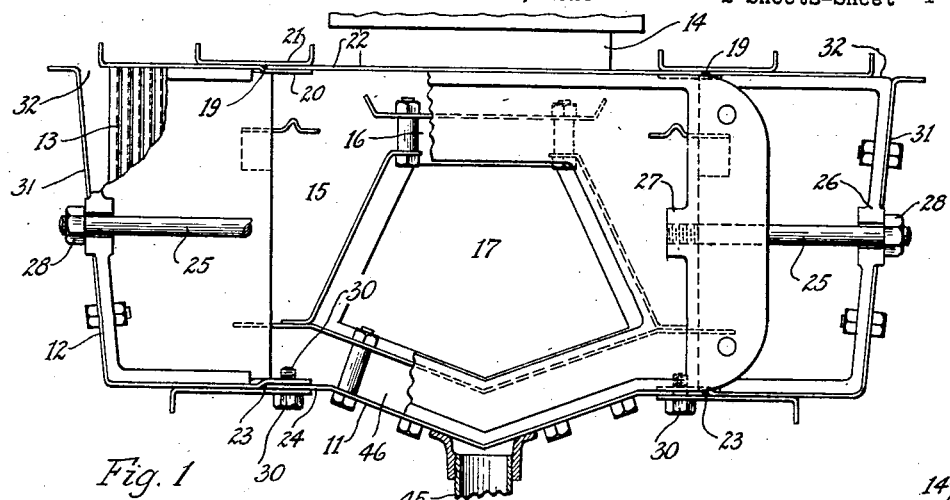
Figure 2:
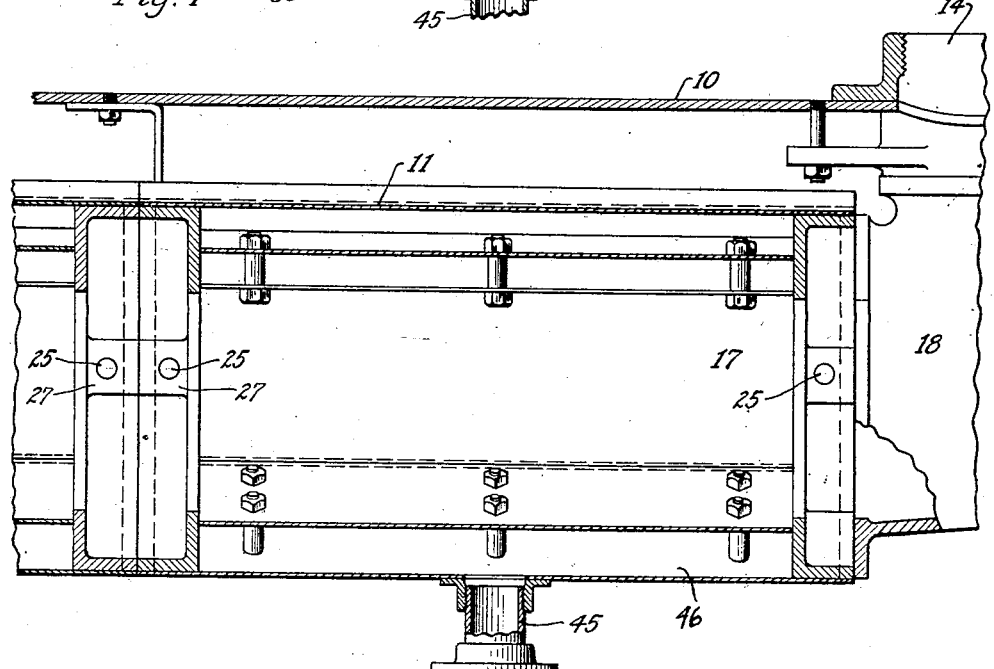
Figure 3:
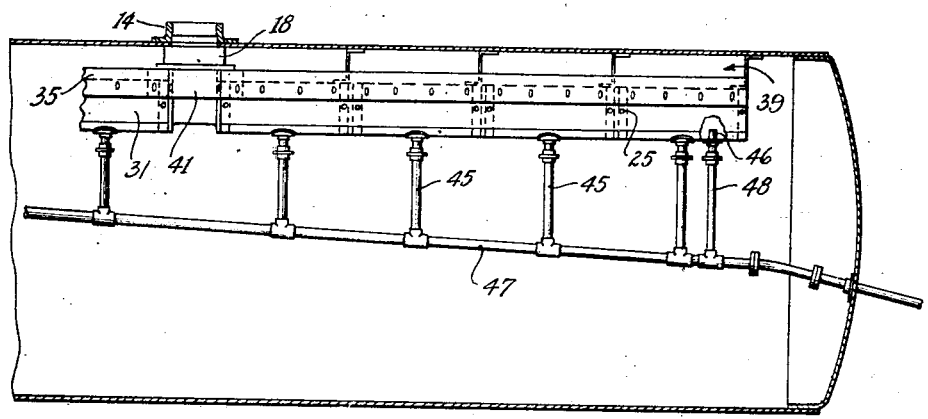
Figure 4:
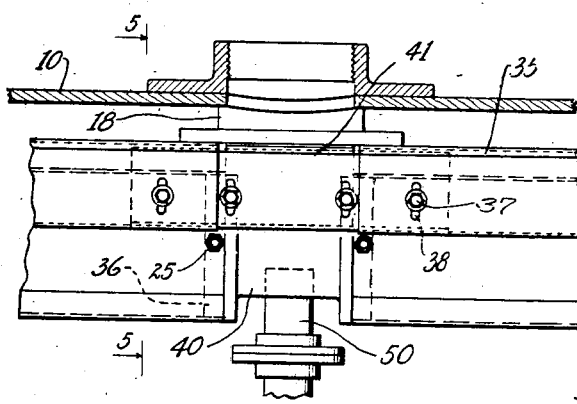
Figure 5:
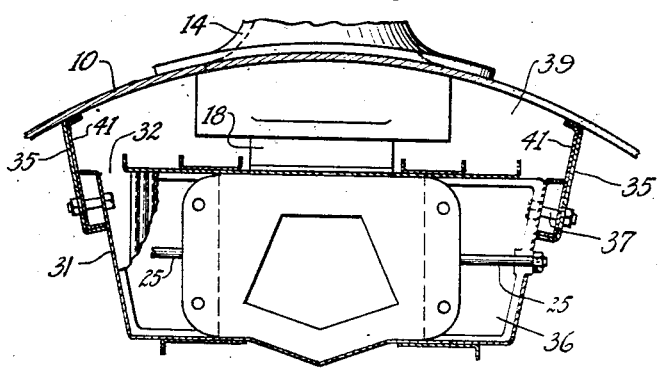

One of the objects of the invention is to provide means for more conveniently assembling and dismantling the separator so that certain portions thereof can be more readily detached or removed. Another object of the invention is to provide means for preventing water or other impurities from entering the separator with the steam. Another object is to provide means for reducing the tendency of the separator to be flooded with water at any time during its operation. Other objects of the invention will be apparent from a consideration of the accompanying drawings and the following description thereof:

Of the drawings Fig. 1 is an end view of a separator section which embodies features of my invention with the drain pipe in section and certain parts broken away; Fig. 2 is a longitudinal central sectional view of the separator; Fig. 3 is an elevation of a series of separators installed in a boiler; Fig. 4 is an elevation of the outlet of two separators with portions of the separators, showing a modification of the system of Fig. 3; and Fig. 5 is a section along the line 5—5 of Fig. 4.

Fluid separators of this nature are ordinarily installed in boilers and it is frequently necessary to assemble the separator in the boiler as the manholes are not large enough to pass in the assembled separator. Also with purifying separators of this nature the separating baffles may become clogged with impurities, such as the minerals in the water, so that it is necessary to clean the baffles; and to do this it is desirable to remove the cartons of baffles from the separator casing. Because of these needs it is desirable to have a simple way of attaching the cartons of baffles to the casing and for removing them. And, as the separators when in use are continually in contact with the heated gases of the boiler there is a tendency for the metal parts to become corroded. This makes it difficult to remove the bolts which bind the parts together, and for this reason also it is desirable to have simple means for detachably holding the sections in place.

The separator which I have illustrated is installed in the steam boiler 10 and comprises a number of sections similar to those of Figs. 1 and 2. It will be understood, however, that the sections at the ends of the separators have closed end plates which prevent steam from entering the ends of the separator. Each of the sections comprise a casing 11 which forms the external portion of the separator; and to this casing are attached cartons 12 of baffles 13 which dry and purify the steam as the steam passes from the boiler through the baffles to the interior chambers. The steam passes from the baffles 13 into the interior chamber 15, through the passageway 16, into the interior chamber 17 and thence into the separator outlet 18 and the boiler outlet 14.

In order to conveniently attach the cartons to the casing 11 so that they may be easily detached therefrom I provide on each side of the separator casing a groove 19, formed in this instance by the plates 20 and 21 fixed to the cartons of baffles, and into this groove passes the outer edge or tongue of the plate 22, which forms the upper wall of the separator. This tongue is adapted to pass readily into the groove when the parts are assembled. The groove, and the plate tongue which enters therein, extend the full length of the carton and fit snugly together and they thus provide a substantially steam tight joint. Similarly a groove 23 is formed by the plates fixed to the lower side of the carton and the outer edge of the plate 24, forming the bottom of the casing, is adapted to pass into this groove.

In order to hold the carton firmly in place with the tongues of the plates 22 and 24 entering the grooves 19 and 23 any suitable means may be used. I prefer to provide studs 25 which pass through frame pieces 26 of the cartons and are threaded into a frame piece 27 of the casing of the separator. By means of nuts 28 threaded on to the ends of the studs the carton is held rigidly in place. As many of these studs may be used as is desired.

By the use of these grooves and studs the cartons may be conveniently positioned and fastened to the casing, and may be detached by merely removing the nuts 28 from the ends of the studs and pulling the cartons outwardly. These studs may be of brass or other non-corrodible metal, and the nuts may thus be readily removed; and the nuts are easily accessible to the workman, and if broken can be very conveniently removed and replaced. If desired a screw 30, or a series of such screws, may be used to fasten together more firmly the groove and tongue in the lower portion of the carton, and in the upper portion also if desired; but it will be understood that such screws in the lower portion are more readily accessible.

Separators such as are disclosed by the said Patent No. 1,381,767 have plates 31 on the sides of the cartons of baffles to prevent water or other substances passing into the baffles. These plates force the steam upwardly and into the upper sides of the cartons through the passageways 32. But I have found that, in certain types of boilers, particularly when they are worked at high capacity, the water and other objectionable substances will frequently be driven over the tops of the plates 31 and into the baffles. To prevent this in such cases I provide extension plates for the outer sides of the cartons which reach from the cartons to, or substantially to, the boiler shell. These may be placed at both sides or on one side only of the separators, and they are made adjustable so that the elevation to which they are raised can be varied. For this purpose I use plates 35 which are bolted to the side plates 31 by means of bolts 37 and have slots 38 therein whereby the plates may be varied in position. By the use of these extension plates the steam may be forced to pass into the end of the passageways 39 formed by the boiler and the separator top and the extension plates. The steam then passes along these passageways and into the baffle cartons through the opening 32 thereof. This arrangement eliminates much of the water and other impurities which otherwise would flow with the steam into the baffle cartons over the ordinary side plates 31.

Also by thus forcing the steam to enter the separator at the ends farthest from the outlets the rate of flow through the baffles 13 is made more uniform and there is more uniform distribution of the steam through the baffles. Thus both the efficiency and the capacity of the baffles are increased.

In order to prevent the water and other impurities from passing with the steam into the cartons around the outlet 18 I provide also baffle plates 41 which connect the sides of the adjacent cartons. These plates 41 are raised to the same elevation as the plates 35 and are fixed thereto by means of the bolts 37 which pass through slots 38 in the plates 41 and 35. Similarly baffle plates for one or both of the ends nearest the outlet may be applied where the conditions make it advisable.

In the use of the separators such as are disclosed by the said patent it is common to use drain pipes 45 which connect with the water chambers 46 of the separators. The moisture which is separated from the steam as it passes through the cartons flows downwardly and into the passageway 46 and thus flows out of the drain pipes 45. It is common to connect these drain pipes to a single manifold pipe 47 which passes out of the boiler at some convenient point and conveys the water to a steam trap or wherever desired. I have found that the air and steam may interfere with the flow of water from this manifold pipe and it is sometimes unable to carry off the water freely enough and there is a tendency for the drain pipes and chambers 46 to become flooded.

To eliminate this tendency a vent pipe 48 may be provided which connects one of the chambers 46 with the pipe 47 so that the air and steam in the drain pipe where the vent pipe connects will have a free discharge to a point of low pressure in the drainage chamber. It will be understood that a vent pipe 50 could connect the manifold pipe with other portions of the separator, such as the outlet 40 as indicated in Fig. 4, the pressure in this outlet being even less than the pressure at the ends of the carton adjacent the outlet of the manifold pipe. But I prefer the connection as indicated in Fig. 3.

I claim as my invention:

1. A fluid separator comprising an outer carton of baffles, and an inner casing, and means for detachably connecting said carton to said casing; said means comprising a stud fixed to said casing and passing outwardly through said carton, and removable means on the outer end of said stud for holding the carton against the side of said casing; one of said elements having a groove extending along its lower side and a tongue fixed to the other element and passing into said groove.

2. A fluid separator comprising an outer carton of baffles, and an inner casing, and means for detachably connecting said carton to said casing; said means comprising a stud fixed to said casing and passing outwardly through said carton, and removable means on the outer end of said stud for holding the carton against the side of said casing; one of said elements having a groove extending along its lower side and a tongue fixed to the other element and passing into said groove; and means for rigidly holding said tongue in said groove.

3. A steam separator adapted to be mounted in a boiler adjacent its upper wall, said separator having a carton of baffles mounted on one side, plates covering the bottom and the outer side of said carton, and another plate fixed to the outer side of said carton and extending substantially the full length thereof and adapted to be extended upwardly to the said boiler wall, and means coacting with the said plates for causing the moisture-laden steam to travel to the carton of baffles.

4. A steam separator adapted to be mounted in a boiler, adjacent its upper wall, and comprising an inner casing and a carton of baffles mounted on each side of said casing, a plate fixed to the outer side of each of said cartons and extending substantially the full length thereof and a second plate fixed outside of said first mentioned plate and projecting upwardly above the outer side of said carton so as to be in contact with said upper boiler wall when said separator is mounted in said boiler, and means coacting with the said plates for causing the moisture-laden steam to travel to the carton of baffles.

5. A steam separator adapted to be mounted in a boiler, adjacent its upper wall, and comprising an inner casing and a carton of baffles mounted on each side of said casing, a plate fixed to the outer side of each of said cartons and extending substantially the full length thereof and projecting upwardly above the outer side of said carton so as to be substantially in contact with said upper boiler wall when said separator is mounted in said boiler; and means for varying the elevation of each of said plates, and means coacting with the said plates for causing the moisture-laden steam to travel to the carton of baffles.

6. A series of fluid separators, each having a liquid drainage chamber in the lower portion thereof, a manifold drain pipe, an individual drain pipe connecting each of said drainage chambers with said manifold pipe, and a vent pipe connecting said manifold pipe with said separator.

7. The combination of a fluid separator and a gas generator, said separator being mounted in said gas generator adjacent its upper wall, said separator having baffles mounted on one side, means for preventing the entrance of gas into said separator at the bottom or sides thereof, means including a portion of said upper wall for preventing gas from entering the upper side of said separator over either side thereof, whereby the gas is forced to enter at the ends of said separator, and a gas outlet communicating with the interior of said separator at a point remote from its ends, and means forming a conduit for conducting the gas from said baffles to said outlet.

8. A fluid separator comprising a frame, a plurality of baffles fixed to said frame, an inner casing, and means for detachably connecting said frame to said casing; said means comprising a stud fixed to said casing and passing outwardly through said frame, and removable means on the outer end of said stud for holding the frame against said casing.

9. The combination of a steam separator and a boiler having a steam outlet, said separator being mounted in said boiler, and said separator comprising two sections, connected at their adjacent ends by a common steam outlet, said common outlet communicating with said boiler outlet, baffles fixed to the sides of said separator sections and extending upwardly substantially to the wall of said boiler.

10. The combination of a steam separator and a boiler having a steam outlet, said separator being mounted in said boiler, and said separator comprising two sections, connected by their adjacent ends by a common steam outlet, said common outlet communicating with said boiler outlet, baffles fixed to the sides of said separator sections and extending upwardly substantially to the wall of said boiler, and a baffle fixed to the adjacent ends of said sections on each side of said common outlet, and extending upwardly substantially to the wall of said boiler.

11. A steam separator adapted to be mounted in a boiler adjacent its upper wall, said separator having a carton of baffles mounted on one side, plates covering the bottom and the outer side of said carton, and a plate fixed to the outer side of said carton and extending substantially the full length thereof and extended upwardly a very material distance above the top of said separator, said separator having a steam outlet a material distance from one end, and means forming a passageway from the inner side of said baffles to said outlet, and means coacting with the said plates for causing the moisture-laden steam to travel to the carton of baffles.

In testimony whereof, I hereunto set my hand.

HARRY E. BOYRIE.